A. HUGHES.
MACHINE FOR GRINDING KNIVES.
APPLICATION FILED OCT. 28, 1918.
1,427,900.                                  Patented Sept. 5, 1922.
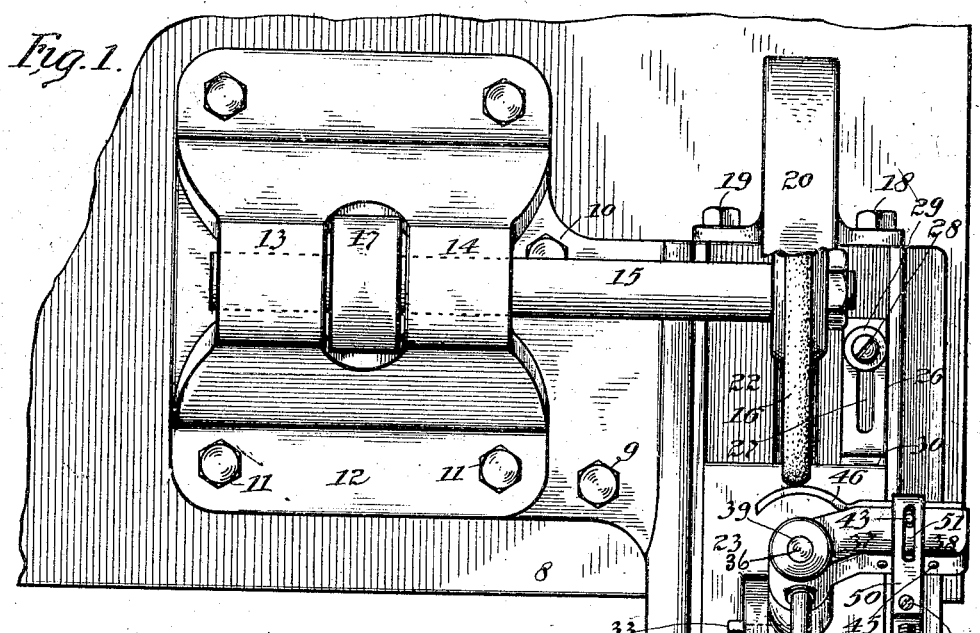
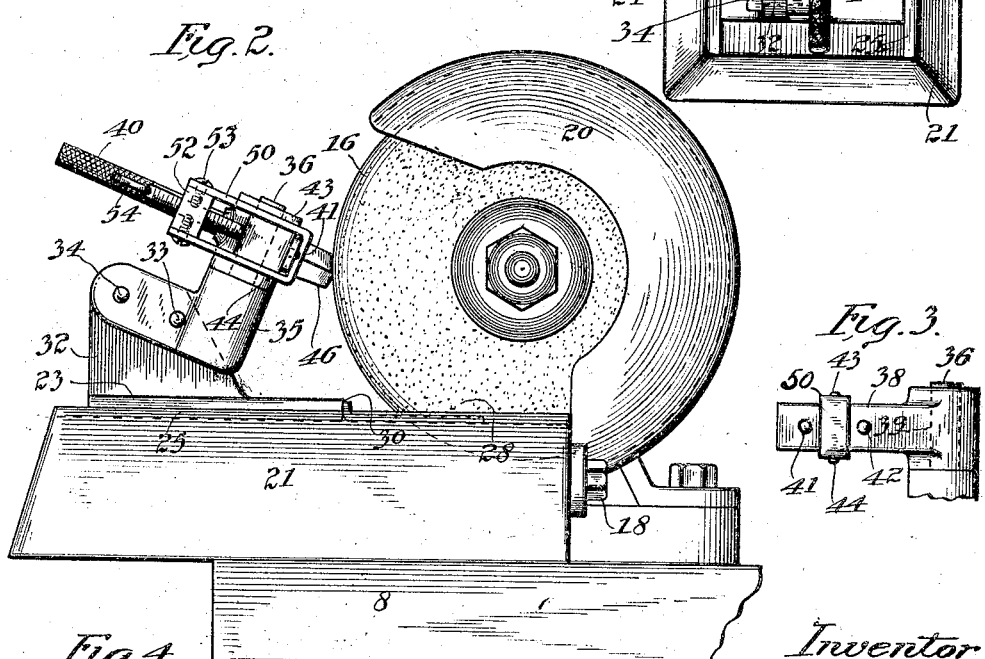
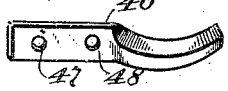
Inventor
Arthur Hughes
By Jones, Addington, Ames & Seibold
Attys.

Patented Sept. 5, 1922.

1,427,900

UNITED STATES PATENT OFFICE.

ARTHUR HUGHES, OF HOOPESTON, ILLINOIS, ASSIGNOR TO SPRAGUE CANNING MACHINERY COMPANY, OF CHICAGO, ILLINOIS, A CORPORATION OF ILLINOIS.

MACHINE FOR GRINDING KNIVES.

Application filed October 28, 1918. Serial No. 259,897.

To all whom it may concern:

Be it known that I, ARTHUR HUGHES, a citizen of the United States, residing at Hoopeston, in the county of Vermilion and State of Illinois, have invented new and useful Improvements in Machines for Grinding Knives, of which the following is a full, clear, concise, and exact description, reference being had to the accompanying drawing, forming a part of this specification.

This invention relates to a machine for grinding knives, and, more particularly, to machines for grinding knives which have curved cutting surfaces.

The object of the invention resides in the provision of an improved means for grinding knives which have curved cutting edges, and in which improved means are provided for applying for cutting surface of the knife to the sharpening medium at the desired and correct angle.

In the specific form of the invention herein illustrated and described, this improved grinding means has been adapted to the grinding of knives which are used in cutting the corn kernels from cobs, and in which the knife is given a curvature so that the cutting surface thereof will approximate the contour of a corn-cob.

The invention is illustrated in the accompanying figures, in which—

Fig. 1 is a plan view of the grinding machine;

Fig. 2 an end view thereof;

Fig. 3 a detail showing the means for securing the knife to the rotating element of the machine, whereby the knife is applied to the abrasing surface at the proper angle;

Fig. 4 is a view in perspective of the type of knife sharpened on the machine of the preferred embodiment of the invention herein illustrated and described; and Fig. 5 illustrates a similar knife having a cutting edge the curvature of which is the reverse of that of the knife illustrated in Fig. 4.

As clearly illustrated in the drawings, the machine is mounted on a base 8 which is fitted with apertures 9 and 10, through which the base 8 may be secured to any suitable means, such as a table, bench, etc. Secured to the base 8 by means of bolts, such as 11, is a bearing bracket 12 equipped with bearings 13 and 14, to which a shaft 15 is journaled, which shaft carries the abrasion wheel 16. Located between the bearings 13 and 14 is a pulley 17 secured to the shaft 15, which may be readily rotated by a belt from any convenient source of power. Secured to the base 8 by means of bolts 18 and 19 is an enclosing casing 20, which completely encloses the outer periphery of the upper and rear face of the abrasion wheel 16. The base 8 is equipped with a forwardly-projecting arm or platform 21, which is equipped with a plate 22 on which is a sliding plate 23 adapted to be moved forward and back between guides or rails 24 and 25, which project upwardly from the two outer lateral edges of the plate 22.

Secured to the rear end of the plate 22 is an adjustable stop-plate 26 fitted with a slide 27, through which, by means of the screw 28 and washer 29, the stop-plate 26 is secured to the plate 22. The plate 26 at its forward end is fitted with an upwardly-extending portion 30, which lays in the path of the slidable plate 23 and limits the forward motion of said plate. The plate 23 is equipped with an upwardly-extending arm 32, said arm having rigidly secured thereto by means of the bolts 33 and 34 a bracket 35. The bracket 35 is fitted with an upwardly-extending cylindrical portion 36, as clearly shown in Figs. 2 and 3. Mounted on the cylindrical member 36 is the knife-carrying mechanism 37. The knife-carrying mechanism 37 comprises an arm 38, which is apertured at 39, the aperture 39 being of such size that it snugly fits over the upwardly-extending cylindrical portion 36 of the bracket 35. Secured to the arm 38 is an operating handle 40. The lower surface of the arm 38 is fitted with a pair of projecting lugs 41 and 42 and each side of the arm 38 is fitted with a projecting lug 43 and 44, respectively. The upper surface of the arm 38 is fitted with a series of apertures, such as 45.

The knife which is to be sharpened, such as 46, contains two apertures, such as 47 and 48, the said apertures 47 and 48 in the knife being so spaced that they will readily fit over the projecting lugs or pins 41 and 42 in the arm 38. The pins 41 and 42, therefore, together with the apertures in the knife, serve to correctly position the knife on the arm 38. The knife 46 is held in this position on the arm 38 by any suitable means, but preferably by a bracket 50, which is provided with a slot, such as 51, in either of its sides, said slots registering with the projecting lugs or pins 43 and 44 in the side face of the arm 38.

The extreme upper ends of the bracket 50 are interconnected by a block, such as 52, said block being secured to the side faces of the bracket by means of screws such as 53'. The block 51 is apertured and threaded to receive a holding screw, such as 54.

It will be evident from the description just preceding that, when the knife is slipped over the projecting lugs 41 and 42 on the arm 38 and the bracket 50 is loosely held on said arm by means of the lugs 43 and 44, the knife 46 can then be securely and rigidly fastened to the arm 38 by tightening up the holding screw 54, the end of this holding screw 54 being held in place when tightly screwed up by registering with one of the apertures, such as 45, in the top face of the block 38.

It will be evident from the description just preceding and from the illustrations, that the non-cutting portion of the knife is secured to the outer of the supporting arm 38, and that, since said arm is rotatable about the upwardly-extending cylindrical post 36 knives of different curvature can be readily ground on this machine by merely changing the distance between the supporting surface of the knife 46 and the center of rotation of the arm 38. Also, due to the fact that the supporting surface of the knife is displaced from the center of rotation of the mounting arm 38, that for a given curvature of knife-cutting surface, the position of the supporting post 36 can be advanced considerably closer to the abrasion wheel 16, which results in more satisfactory operation of the machine, since the cutting edge of the knife can be held against the abrasion wheel 16 with less vibration. It will also be evident from the fore-going that, in order to change the curvature of the cutting edge to be ground on the abrasion wheel 16, it is merely necessary to provide knife-holding mechanisms 37, in which the arms 38 vary in the distance interposed between the center of the supporting aperture 39 and the clamping surface for the knife 46.

In the actual practice of sharpening knives of the type herein disclosed for cutting the kernels from cob of corn, knives of varying degree of curvature are utilized, to conform, or rather approximate the size of the cob from which the kernels are to be cut, the cobs having been previously graded before they are subjected to the cutting operation. For sharpening the knives for this purpose, therefore, a plurality of knife-holding mechanisms are provided which will give the curvatures necessary for the cutting operations for the various sizes of cobs that have been graded according to selected standards.

The operation of the machine is, briefly, as follows: The abrasion wheel 16 attached to the shaft 15 is rotated by means of a belt which drives the pulley 17. The knife 46 to be ground is secured to the arm 38 of the knife-holding mechanism by means of the clamp 50, as hereinbefore described. The adjustment-stop 26 is then regulated to limit the forward movement of the plate 23, the position of this stop automatically regulating the amount of metal which is ground from the knife in the sharpening operation. With the knife in position on the arm 38, the adjustment stop 26 properly positioned, and the abrasion wheel 16 rotating at the desired speed, the plate 23 is advanced until the cutting edge of the knife strikes the wheel 16. The entire cutting surface of the knife is then slowly applied to the wheel by rotating the knife-holding mechanism 38, by means of the handle 40, about the cylindrical post 36. Since the arm 38 rotates about a fixed center, the cutting edge of the knife 46 will be applied to the cutting surface of the wheel 16 in a determined and definite arc, when the arm 38 is rotated about the post 36.

To sharpen the knife-blade 56 shown in in Fig. 5, in which the cutting edge has a curvature the reverse of that of the knife 46, the knife-holding mechanism 37 is turned over—that is, rotated through 180 degrees —so that the arm 38 projects from the left side of the supporting post 36. With the knife-holding mechanism 37 in this position, a knife having the reverse curvature of the one illustrated in Fig. 4 will have its cutting edge ground in the same manner as hereinbefore described for the knife 46, which is secured to the knife-holding mechanism 37 when the arm 38 projects to the right side of the supporting post 36.

It will be obvious from the foregoing that with this improved machine knives having curved cutting surfaces may be readily sharpened by inexperienced operators, and with true and uniform cutting edges. The type and character of the cutting edge is automatically determined by the adjustment of the machine and these are consequently independent of the human equation, the only manual effort required in the actual sharpening of the knife being the rotation of the knife-holding mechanism 37 about its supporting post 36. Further, as hereinbefore stated, the grinding of the cutting edges of knives having any desired degree of curvature is automatically regulated by this machine after the original machine set up is completed. The only adjustment necessary in changing the setting up of the machine from the grinding knives of one curvature to the grinding of knives of another curvature being the change in the knife-holding mechanism 37. These mechanisms can be readily supplied with the machine for the various knife curvature which it is desired to sharpen.

Obviously, the invention is not limited to the specific embodiment thereof herein illustrated and described, but is capable of many variations and other applications without departing from its spirit and scope as set forth in the following claims.

Having thus described my invention, what I claim as new and desire to secure by Letters Patent is:

1. In a device of the character described, in combination a base; an abrasion means rotatably mounted on said base; a slidable plate associated with said base and adapted to be moved toward and away from said abrasion means, a rotatable arm; a mounting post secured to said plate for mounting said rotatable arm; positioning means associated with said arm for definitely locating the knife in a determined position on said arm, and adjustable clamping means for clamping the knife to said arm in this position; and an operating handle associated with said arm, whereby it may be rotated about said post to apply the cutting edge of the knife to said abrasion means along the line of curvature of a determined arc.

2. A grinding machine comprising a rotatable grinding wheel, a knife-holder mounted to swing about an axis lying in the plane of said grinding wheel, a slide on which said knife-holder is rotatably mounted, and adjustable stop means for definitely positioning said slide with respect to said grinding wheel, whereby an arcuate knife may be drawn transversely across the edge of said grinding wheel, and its edge ground on a ture arc of a circle, and whereby arcuate knives of different radii may be ground on said machine.

3. A grinding machine comprising a rotatable grinding wheel, a knife-supporting arm, means for supporting said arm to swing about an axis lying in the plane of said wheel, said arm extending laterally from said axis with respect to the plane of said wheel, and means for securing the shank of a corn cutting knife having a curved blade to said arm, said arm being reversible so that it can be made to extend laterally in either direction from the plane of said grinding wheel, whereby either right or left hand knives can be ground using the same arm.

In witness whereof, I have hereunto subscribed my name.

ARTHUR HUGHES.